US008490208B2

(12) United States Patent
Courtay

(10) Patent No.: US 8,490,208 B2
(45) Date of Patent: Jul. 16, 2013

(54) METHOD AND DEVICE FOR DETECTING IF A COMPUTER FILE HAS BEEN COPIED AND METHOD AND DEVICE FOR ENABLING SUCH DETECTION

(75) Inventor: Olivier Courtay, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 142 days.

(21) Appl. No.: 12/928,808

(22) Filed: Dec. 20, 2010

(65) Prior Publication Data

US 2011/0167276 A1    Jul. 7, 2011

(51) Int. Cl.
*G06F 7/04* (2006.01)
(52) U.S. Cl.
USPC .......................................................... 726/32
(58) Field of Classification Search
USPC ................. 713/189, 193, 165; 726/32, 23, 26
See application file for complete search history.

(56) References Cited

U.S. PATENT DOCUMENTS

| | | | |
|---|---|---|---|
| 5,584,023 A * | 12/1996 | Hsu ....................................... | 1/1 |
| 7,117,535 B1 | 10/2006 | Wecker | |
| 7,320,008 B1 * | 1/2008 | Colgrove ............................... | 1/1 |
| 2005/0027657 A1 | 2/2005 | Leontiev et al. | |
| 2009/0268903 A1 * | 10/2009 | Bojinov et al. .................. | 380/45 |

OTHER PUBLICATIONS

Banikazemi et al., "Storage-Based File System Integrity Checker", Retrieved from the Internet: URL:http://www.trecc.org/features/storageSS-205/program/w8paper7.pdf>, Dec. 31, 2005.
"Assign File to a Specific Inode on Root File System on HPUX", Retrieved from the Internet: URL:http://forums13.itrc.hp.com/service/forums/questionanswer.do?threadId=110411&hpweb_printable=true>, Oct. 17, 2001.
"Inode License Management" Retrieved from the Internet: URL:http://forums13.itrc.hp.com/service/forums/questionanswer.do?threadId=231022&hpweb_printable=true>, Oct. 10, 2003.
Search Report Dated May 10, 2010.

* cited by examiner

*Primary Examiner* — Beemnet Dada
(74) *Attorney, Agent, or Firm* — Tutunjian & Bitetto, P.C.

(57) ABSTRACT

A method of detecting whether a computer file has been copied, the computer file comprising a software program and having an inode number. The inode number of the computer file is retrieved by the software program. From the computer file, a stored inode number is read, the stored inode number being the inode number of a file system from which the computer file should not be copied. The retrieved inode number and the read inode number are compared and it is determined that the computer file has been copied if the retrieved inode number does not match the read inode number. Also provided are a method of enabling detection of the copying of a computer file, and devices and software program products corresponding to the methods.

4 Claims, 3 Drawing Sheets

METHOD AND DEVICE FOR DETECTING IF A COMPUTER FILE HAS BEEN COPIED AND METHOD AND DEVICE FOR ENABLING SUCH DETECTION

This application claims the benefit, under 35 U.S.C. §119 of European Patent Application 10305005.0, filed Jan. 4, 2010.

TECHNICAL FIELD

The present invention relates generally to copy protection, and in particular to software copy protection.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It will come as no surprise that software distributors are facing piracy in the sense that some people are using unauthorized copies of the software applications without paying for them. This is particularly true in the domain of computer games. Game providers and distributors therefore use protection mechanisms and in an attempt to thwart such piracy. Such protection mechanisms include:
SecuROM
SafeMedia
Changing address marks and other marks or sync fields on floppy disks.
The use of data on CD-ROMs in places where it cannot be written on a CD-R.
Having the software require evidence of purchase to work properly. Registration keys and serial numbers may also be used this way.
Dongles
Bus encryption
A keyfile that must be stored in the same directory as the software execution file.
Product activation via phone or the Internet.

The software is often tied to a certain computer through a unique identifier of the computer, such as a hardware serial number or MAC address, but this is difficult on a standard PC as only few such identifiers are easily available. Furthermore, if the identifier is set in a file (such as a keyfile), then the file itself may be copied to another computer, and the MAC address may be changed on modern Ethernet cards, thus overcoming the copy protection.

In addition to the problems already mentioned, hackers often react by developing tools that at least partly defeat these protection mechanisms.

Banikazemi et al. present an intrusion detection system (IDS) in "Storage-base File System Integrity Checker". The system is able to detect modifications to data and also allows a roll-back to unmodified versions of the data. The IDS comprises a number of hosts that store data on centralised disks, and a distinct Storage Area Networks Volume Controller (SVC). The SVC generates verification data by, among other things, reading metadata such as superblock and inode tables for thefiles. The verification data is then stored in a location that is inaccessible by the hosts, in order to ascertain that these do not tamper with the verification data. The SVC then uses for instance the inode numbers to verify if an intrusion has modified the files. While the system may work well for intrusion detection, it does not prevent copying of files.

It can therefore be appreciated that there is a need for a further copy protection scheme, in particular one that may work on a standard PC. The present invention provides such a solution.

SUMMARY OF INVENTION

In a first aspect, the invention is directed to a method of detecting whether a computer file has been copied, the computer file comprising a software program and having an inode number. The inode number of the computer file is retrieved by a processor executing the software program; a stored inode number is read, the stored inode number being the inode number of a file system from which the computer file should not be copied; the retrieved inode number and the read inode number are compared; and it is determined that the computer file has been copied if the retrieved inode number does not match the read inode number.

In a first preferred embodiment, the stored inode number is read from the computer file.

In a second preferred embodiment, the read inode number is encrypted using an encryption key and the retrieved inode number is encrypted, using the encryption key, so as to enable the comparison.

In a third preferred embodiment, the read inode number is encrypted using an encryption key and the retrieved inode number is decrypted, using a corresponding decryption key, so as to enable the comparison.

In a fourth preferred embodiment, the computer file is a license file for a software application and the method is performed during execution of the software application by the device. Execution of the software application is stopped upon determination that the license file has been copied.

In a second aspect, the invention is directed to a method of enabling detection of copying of a computer file by a software program comprised in the computer file. The computer file is created, thereby associating the computer file with an inode number, which is retrieved and stored.

In a first preferred embodiment, the inode number is stored in the computer file.

In a third aspect, the invention is directed to a device for detecting whether a computer file comprising a software program and having an inode number has been copied. The device comprises a processor for, when executing the software program, retrieving the inode number of the computer file; reading a stored inode number, the stored inode number being the inode number of a file system from which the computer file should not be copied; comparing the retrieved inode number and the read inode number; and determining that the computer file has been copied if the retrieved inode number does not match the read inode number.

In a first preferred embodiment, the processor is further for executing a software application and for stopping the execution of the software application upon determination that the computer file has been copied.

In a fourth aspect, the invention is directed to a device for enabling detection of copying of a computer file by a software program comprised in the computer file. The device comprises a processor for: creating the computer file; retrieving the inode number of the created computer file; and storing the retrieved inode number in the created computer file.

In a fifth aspect, the invention is directed to a software program product having stored thereon instructions that, when executed by a processor performs the method of the first aspect.

In a sixth aspect, the invention is directed to a software program product having stored thereon instructions that, when executed by a processor performs the method of the second aspect.

BRIEF DESCRIPTION OF DRAWINGS

Preferred features of the present invention will now be described, by way of non-limiting example, with reference to the accompanying drawings, in which.

DESCRIPTION OF EMBODIMENTS

A main inventive idea of the present invention is to use an aspect of a file system to implement copy control, which is why a short description of file systems is in order to facilitate understanding.

A file system may be said to be a system that facilitates organization and access of data. A disk file system is a file system for use on storage devices, such as for example a disk. There are many disk file systems, FAT, NTFS, HFS, and UFS being but a few examples. Of these, FAT and to some degree NTFS are particularly widespread as they are used by Microsoft Windows.

Figure 1:
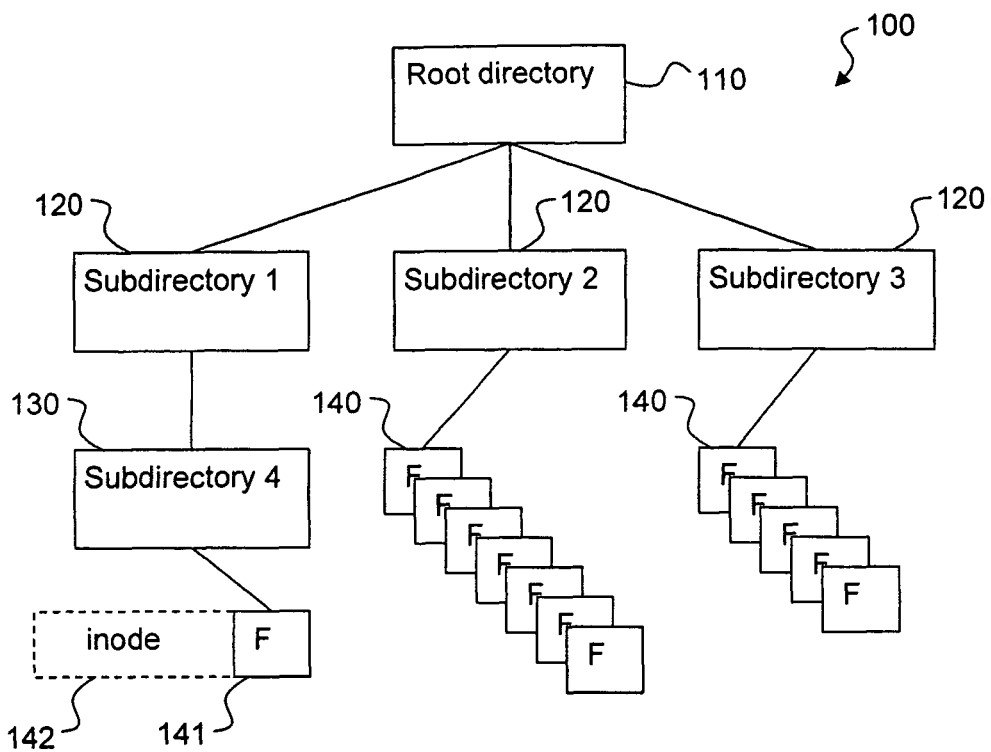
FIG. 1 illustrates a prior art file system using a tree structure.

A feature common to most disk file systems is the use of a tree structure, an example of which is illustrated in FIG. 1. The file system 100 is comprised of a number of directories 110, 120, 130 and a number of files 140, 141. A root directory 110 is at the top of the tree structure. The root directory 110 comprises three subdirectories 120. Of the subdirectories 120, subdirectory 2 and subdirectory 3 comprise a number of files 140, while subdirectory 1 comprises a further subdirectory 130. The further subdirectory 130, subdirectory 4, comprises a file 141. The skilled person will appreciate that this is just an example and that there for instance is no limit to the number of directory levels.

Each entity—i.e. directory, subdirectory and file—in the file system 100 may be regarded as a node, called inode 142 (illustrated only for one file 141). Each inode is associated with metadata, such as information about ownership, access rights, and type, and it is identified by an inode number that is unique in the file system and remains the same for the entity throughout its lifetime. In other words, the inode number is constant for each entity.

A main inventive idea of the present invention is thus to use the inode number to enforce copy control.

Figure 2:
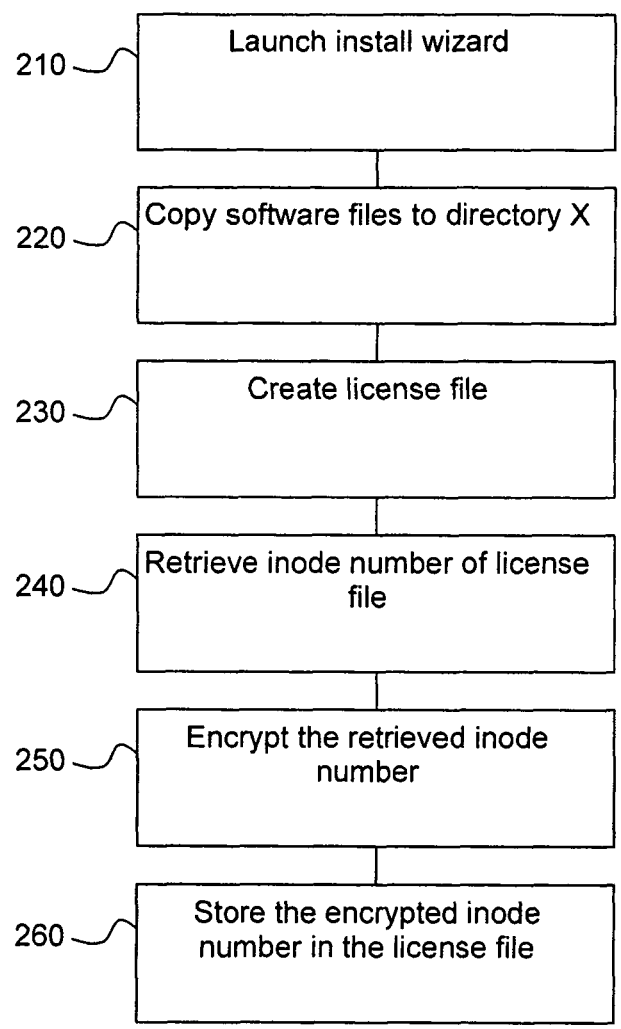
FIG. 2 illustrates a method of software installation according to a preferred embodiment of the present invention.

FIG. 2 illustrates a method of software installation according to a preferred embodiment of the present invention. It is assumed that the user has the rights to install the software; any authorization check is beyond the scope of the present invention. In step 210, the user launches an installation application, called the install wizard, for the software. The install wizard copies 220 the software files into the file system, usually on a hard disk, and performs other prior art tasks necessary for the installation, although these tasks are beyond the scope of the present invention.

The install wizard also creates 230 a file, called a license file, in the file system, preferably in the same directory as at least some of the copied (or installed) software files, although it may be created elsewhere as long as its location is known to the software application. The install wizard then retrieves 240 the inode number of the created license file and encrypts 250 the inode number using a secret key that is also known by the installed software program. The install wizard finally stores 260 the encrypted inode number in the license file. The software is then installed.

It should be noted that the license file is not necessarily dedicated only to having (and possibly storing) an inode value; the license file may for example also comprise computer code and/or other data.

Figure 3:
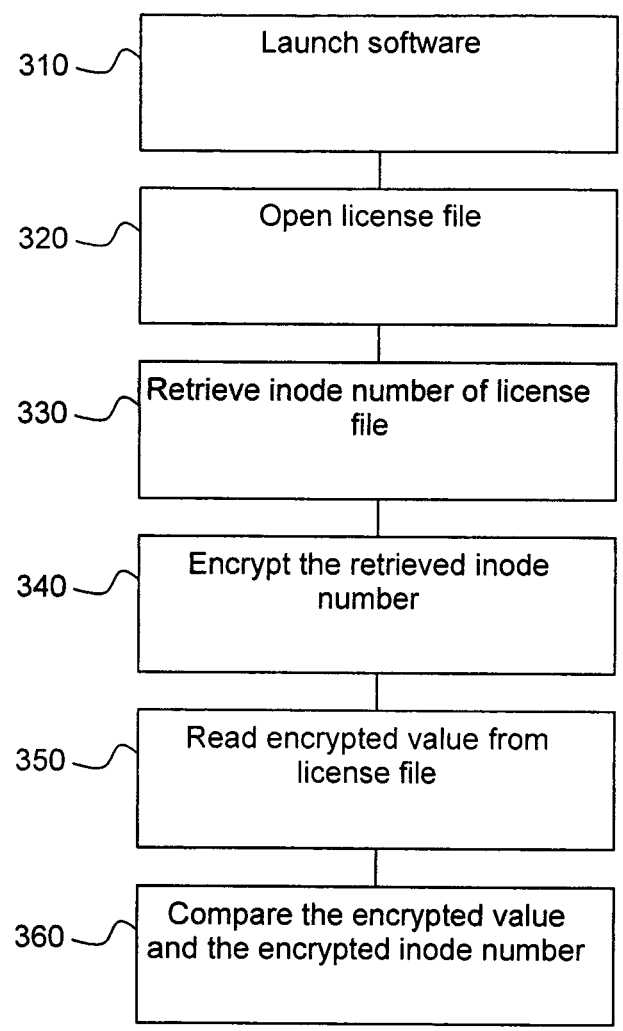
FIG. 3 illustrates a method of copy control according to a preferred embodiment of the present invention.

FIG. 3 illustrates a method of copy control according to a preferred embodiment of the present invention. In step 310 the software is launched. The software then opens 320 the license file, retrieves 330 its inode number, and encrypts 340 the inode number with the secret key. The software then reads 350 the encrypted value stored in the license file and compares 360 the encrypted inode number with the read encrypted value. In case these values are different, the software execution is interrupted; conversely, if the values are identical, the software execution continues. Likewise, the method may stop already at 320 if there is no license file present in the file system.

The skilled person will appreciate that the steps of the methods illustrated in FIGS. 2 and 3 may be somewhat altered without affecting the workings of the methods. For example, the license file may be generated (step 230) before the software files are copied to directory X (step 220); indeed, the copying step (220) may be performed at practically any moment after the launching of the install wizard (step 210). Furthermore, in FIG. 3, the reading step (350) may be performed at any point between the launching of the software (310) and the comparison of the values (step 360).

It will also be appreciated that the copy control method of FIG. 3 has at least one alternate embodiment. This alternate embodiment uses decryption instead of encryption, but the general idea is the same. In the alternate embodiment, steps 310-330 are performed as in the preferred embodiment, followed by step 350, i.e. the reading of the encrypted value from the license file. However, the encrypted value is decrypted, resulting in the original inode number, which is then compared with the retrieved inode number of the license file. Naturally, in this alternate embodiment, the software has access to the decryption key that corresponds to the encryption key of the install wizard. In a further variant, the encrypted inode number of the license file is stored in another location, e.g. in a further file, than the license file.

Figure 4:
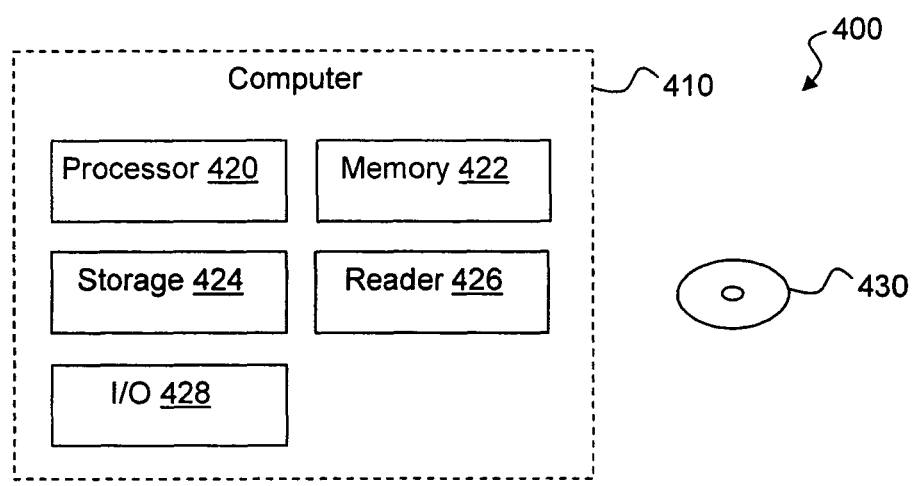
FIG. 4 illustrates a system suited for the implementation of the methods according to the invention.

FIG. 4 illustrates a system suited for the implementation of the methods according to the invention. The system 400 comprises a computer 410 and a storage device 424, which may be internal to the computer 410. The computer 410 advantageously comprises a processor 420, memory 422, a network interface 428, and a reader 426 for reading data from data supports, such as a DVD 430 that stores the (uninstalled) software application and the install wizard.

During software installation, i.e. the method illustrated in FIG. 3, the reader 426 reads install wizard from the support 430 and the processor 420 executes the steps of the method, where necessary instructing other parts (memory 422, storage 424 . . . ) to perform certain tasks.

During copy control, i.e. the method illustrated in FIG. 4, the processor 420 performs the step of the method, where necessary instructing other parts (in particular the storage 424) to perform certain tasks.

It will further be appreciated that the encryption key (or, in the alternate embodiment, the decryption key) of the software preferably is protected by any suitable prior art software protection techniques, for example code obfuscation, that is intended to make it difficult for an attacker to recover the encryption key. Such techniques are however beyond the scope of the present invention.

As it is unlikely that a specific file is associated with the same inode number in two different file systems, the invention can provide copy protection that has a high probability of successfully detecting unauthorized copies.

It will be appreciated that the methods of the present invention can be implemented using only standard operations—read and write—which means that there are no specific system calls that an attacker may intercept.

It will thus be appreciated that the present invention can provide methods and a device for copy protection for a software application.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A non-transitory program storage device, readable by a computer, tangibly embodying a program of instructions executable by the computer to perform, on a device executing the program, a method of detecting whether a computer file has been copied, the computer file being generated during installation of a software program and having an inode number, the method comprising the steps of:

retrieving the inode number of the computer file;

reading from the computer file a stored inode number, the stored inode number being the inode number of a file system from which the computer file should not be copied;

comparing the retrieved inode number and the read inode number; and determining that the computer file has been copied when the retrieved inode number does not match the read inode number;

wherein the stored inode number is encrypted using an encryption key and the method further comprises encrypting the retrieved inode number using the encryption key to enable the comparison or decrypting the read inode number, using a corresponding decryption key, to enable the comparison.

2. The method of claim 1 further comprising the step of stopping execution of the software program upon determination that the computer file has been copied.

3. A device for detecting whether a computer file has been copied, the computer file being generated during installation of a software program and having an inode number, the device comprising:

a processor configured, when executing the software program, to:

retrieve the inode number of the computer file;

read from the computer file a stored inode number, the stored inode number being the inode number of a file system from which the computer file should not be copied;

compare the retrieved inode number and the read inode number; and determine that the computer file has been copied when the retrieved inode number does not match the read inode number;

wherein the stored inode number is encrypted using an encryption key and the processor is further configured to:

encrypt the retrieved inode number using the encryption key to enable the comparison; or decrypt the read inode number, using a corresponding decryption key, to enable the comparison.

4. The device of claim 3, wherein the processor is further configured for executing a software application and for stopping the execution of the software application upon determination that the computer file has been copied.

* * * * *